Patented July 3, 1951

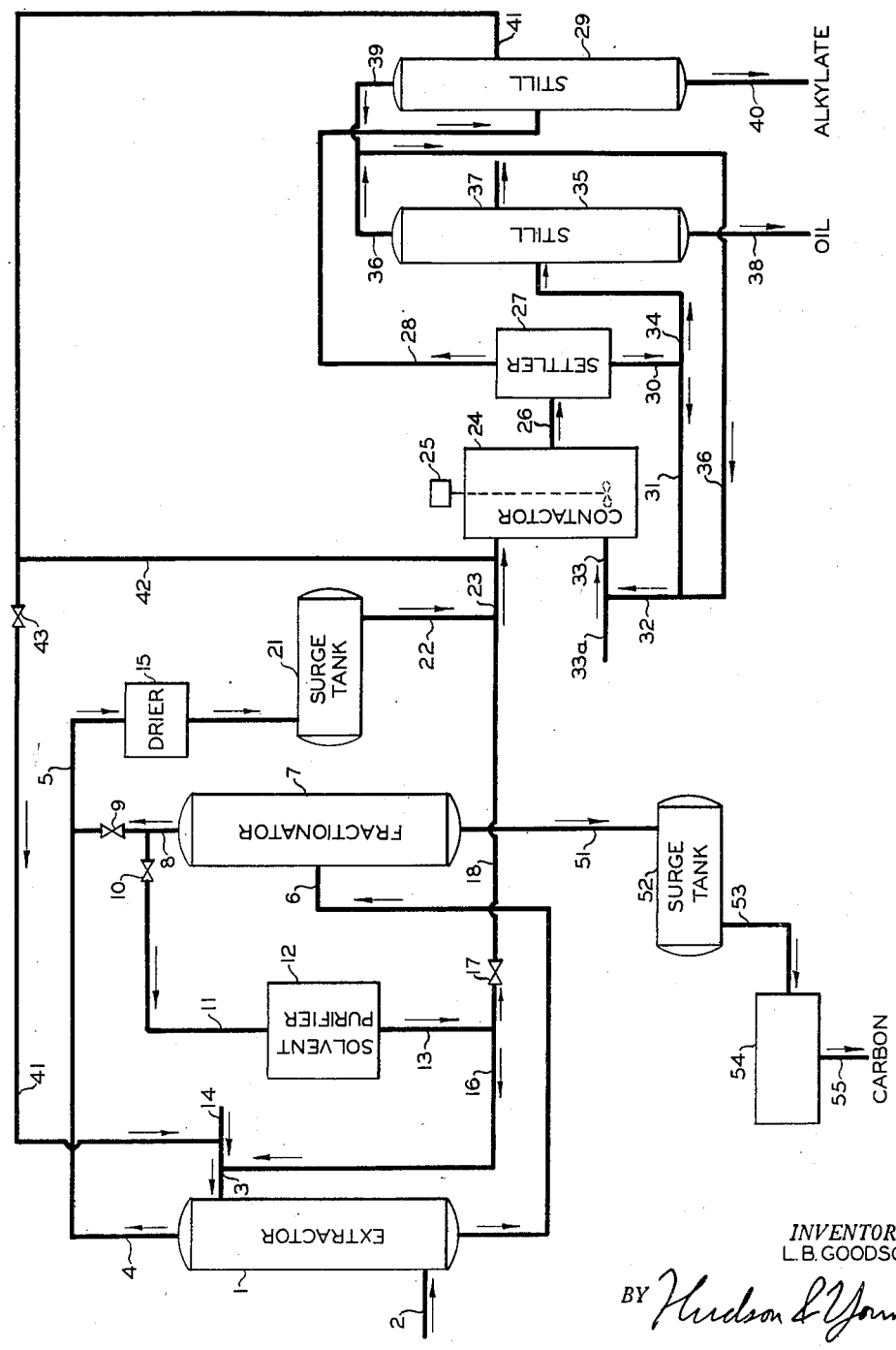

2,558,838

UNITED STATES PATENT OFFICE

2,558,838

TREATMENT OF CATALYTIC GAS OILS

Luke B. Goodson, Okmulgee, Okla., assignor to Phillips Petroleum Company, a corporation of Delaware Application December 20, 1948, Serial No. 66,284

4 Claims. (Cl. 196—14.42)

This invention relates to a process for treating catalytically produced gas oils. In one of its more specific aspects it relates to a process for treating gas oils produced by catalytic cracking methods wherein the gas oils are converted to products having greater value than the original gas oils.

At the present time, gas oils produced in catalytic cracking operations are much less valuable products than virgin gas oils of the same boiling range. This is mainly due to the large proportion of olefinic and aromatic type compounds which these gas oils contain. The main use for such materials has in the past been for fuel oil or burning purposes. For fuel uses oils do not ordinarily command a very high price in comparison to the selling price of other hydrocarbon products. Fuel oils frequently have sold for as low as one dollar per barrel which is equivalent to a little less than two and one-half cents per gallon. Such oils have sold for as little as one cent per gallon.

I have devised a process for converting such a degraded hydrocarbon oil into products having greater value than fuel oils.

An object of my invention is to provide a process for converting a fuel type of hydrocarbon into a more valuable product. Another object of my invention is to provide a process for converting catalytically produced gas oils into one or more valuable products the sum total of which is greater than the value of the original gas oil. Still other objects and advantages of my invention will be obvious to those skilled in the art upon reading the following specification and drawing, which respectively describes and illustrates a preferred embodiment of the process of my invention.

The drawing is a diagrammatic view of a preferred embodiment of the apparatus and process of my invention.

Referring now to the drawing, main apparatus parts are a liquid-liquid contacting or extractor vessel 1, a purifier vessel 12, stills or fractionators 7, 35 and 29, a drier 15, a contactor vessel 24, a settler 27, surge tanks 21 and 52, and a carbon black producing apparatus 54. The remaining pieces of apparatus illustrated in the drawing are pipes or conduits and several valves, and these pieces of apparatus will be referred to in the explanation of the operation of the process.

Broadly speaking, my process consists in solvent extracting a catalyticlaly produced gas oil into a raffinate phase and an extract phase. The raffinate phase consists mainly of olefinic hydrocarbons and some paraffinic hydrocarbons in which is dissolved a small amount of the extraction solvent. This raffinate phase is taken as produced in the extraction step and mixed with an alkylatable aromatic material which may be material used as the solvent, and exposed to alkylation conditions, preferably in the presence of a catalyst so as to produce a high molecular weight high boiling alkylate product. After removal of the alkylation catalyst and unreacted hydrocarbons or other material, an alkylate product is produced which finds use as an intermediate product in the manufacture of synthetic detergents.

The extract phase from the extraction step contains mainly aromatic type of hydrocarbons and this phase is treated for removal of extractant and the extracted materials are used in the manufacture of a high quality carbon black. As a preferred embodiment of my invention, I use an extraction solvent which is an aromatic compound and this aromatic compound can be alkylated under the proper operating conditions by the high molecular weight olefinic hydrocarbons of the raffinate phase. One extraction solvent which is satisfactory for this purpose is phenol. Cresolic materials, such as ortho-, meta- or para-cresols or mixtures thereof may also be used. Di-hydroxy benzenes, such as resorcinol, catechol, or even hydroquinone, may be used as the extract solvents provided the extraction operation is carried out at a sufficiently high temperature that these di-hydroxy compounds exist as liquids. Of these several extraction solvents, I prefer to use phenol as the extractant material.

The alkylation operation carried out in the contactor 24 is preferably carried out in the presence of a catalyst and such conventional alkylation catalysts as hydrofluoric acid, sulfuric acid or phosphoric acid may be used. Of these or other alkylation catalysts, I prefer to use hydrofluoric acid as catalyst. When using hydrofluoric acid as catalyst, the alkylation reaction may be carried out at atmospheric temperature or thereabouts, or it may be carried out at any temperature between 50° F. and 200° F. When using hydrofluoric acid as the alkylation catalyst, any water present in the feed stocks usually finds its way out of the system as a hydrofluoric acid-water azeotrope and such an azeotrope has to be treated further for recovery of the hydrofluoric acid or otherwise, the hydrofluoric acid content of the azeotrope may be lost to the present operation. In order to make certain that water is kept out of my alkylation system, I provide the drying apparatus 15 in which the raffinate phase from the extraction column is treated for removal of the dissolved moisture prior to passage of this stock into the alkylation contactor 24. Any material removed from the top of the fractionator 7 through line 8 and valve 9 and combined with the raffinate stock for alkylation also is dried on passage of this combined stock through the drier 15.

In case the overhead material from fractionator 7 is taken through valve 10 and line 11, it is passed into the solvent purifier 12. When this overhead material follows this process flow, it passes on through lines 13, 16 and 3 into the extractor vessel 1 as recycle solvent. The solvent purifier vessel 12 may include any purification steps deemed necessary for making certain that the extractant is in condition for reaction in the extractor 1. The solvent purifier may include a drier and/or still for removal of undesirable materials or it may include any other purification step found necessary. In any event, if some of the solvent removed from the top of the fractionator 7 through line 8, valve 10 and line 11, is to be passed from the purifier through line 13, valve 17 and lines 18 and 23 into the alkylation contactor 24, the purifier 12 should include a drier for removal of moisture.

The fractionator 7 is essentially a conventional fractionator or still in which the extract phase from the extractor is distilled for recovery of the solvent for recycling to the extractor. The extract oil in this case is highly aromatic and is excellent charge stock for the production of a quality carbon black. The contactor vessel 24 is provided with a stirring apparatus 25 which is intended to intimately contact the liquid charge stock entering the contactor through line 23 and the liquid catalyst entering through line 33. This stirrer apparatus 25 may be a motor driven propeller as illustrated diagrammatically or it may be any other type of stirring or agitating equipment suitable for the purpose at hand. The reacted mixture of liquid oils and catalyst is removed from the reactor through a line 26 into the settling tank 27 in which the catalyst and catalyst-hydrocarbon complex material settle as a heavy phase to the bottom while the alkylation material rises to the top as a separate hydrocarbon layer. This upper layer passes through a line 28 into a still or fractionator 29 in which dissolved catalyst is separated and taken overhead through line 39 for recycling through lines 30, 32 and 33, into the contactor 24. Unreacted extraction solvent may be removed from still line 29 through the side draw 41 and passed through valve 43 and on through conduits 41 and 3 into the original extraction vessel. The highest boiling material is removed from still 29 through the bottoms draw-off line 40 for such disposal or use as desired. This alkylate material from line 40 may contain higher boiling materials than are used in the manufacture of detergents and such higher boiling materials may be separated from the detergent stock in separate fractionating equipment, not shown.

The heavy acid-rich phase from the bottom of the settler 27 is removed therefrom through line 30 and is passed through line 34 into the still or fractionator 35. From this fractionator there is taken overhead through line 36 free hydrofluoric acid and this acid from line 36 is combined with that from line 39 and the mixture is recycled into the contactor 24. Any water present in this alkylation system may be removed through a side draw 37 as an HF—H₂O azeotrope for such disposal as desired. Any high boiling material which is included in the catalyst phase is withdrawn through the bottoms draw-off line 38 for such disposal as desired. The catalyst phase in the settler 27 is relatively active as a catalyst and some of this material passing through line 30 may be passed through line 31 for recycling into the contactor 24. In fact, the larger portion of the catalyst phase from settler 27 is recycled through lines 30, 31, 32, and 33, into the contactor for reuse while only sufficient catalyst phase is passed through line 34 for fractionation in still 35 for removal of the water content and for removal of the heavy oil bottoms so that the water and the heavy oil will not build up in the alkylation system. All of the free hydrofluoric acid taken overhead from the stills 29 and 35 is recycled into the contactor 24 while only a sufficient amount of the liquid catalyst phase from the settler 27 is recycled so as to maintain a titratable HF acidity equal to from 80 to 90 per cent. Catalyst of this titratable acidity is active for promotion of the alkylation reaction for the production of quality stock for the production of detergents. In case makeup hydrofluoric acid is needed it may be introduced into the contactor through line 33a from a source, not shown.

Makeup extractant solvent as needed for the extraction and alkylation system is introduced into the system through line 14 from a source, not shown. The highly aromatic extract oil withdrawn from the bottom of the fractionator 7 is passed through line 51 into a surge tank 52 from which the oil, as needed, is passed through a line 53 into the carbon black producing equipment 54. From this equipment finished carbon black is removed through a line 55 for such disposal or use as desired. The apparatus referred to by reference numeral 54 as the carbon black producing apparatus may be any usual furnace black apparatus in which vaporized oil is used as a feed stock. For example, the apparatus described in U. S. Patents 2,375,796 and Re. 22,886 may be used. I prefer to operate the apparatus 54 according to the methods described in these patents, and when so operated an improved quality carbon black of a high yield based on the volume of aromatic oil charged is produced.

In the operation of the alkylation contactor 24, it is preferable to maintain a phenol to olefin hydrocarbon ratio of at least 1:1 and preferably from 4 or 5:1. In a preferred operation, valve 43 is closed so that the phenol which is not consumed in the alkylation of the olefin and is removed through line 41 may in its entirety be passed through line 42 into line 23 for recycling into the alkylation reactor. In this manner, the phenol merely goes round and round until finally consumed and in so doing assists in maintenance of a high aromatic to olefin ratio. Some little aromatic enters the alkylation system with the olefin raffinate stock while in case additional aromatic is needed to maintain the proper aromatic to olefin ratio, valve 9 may be opened to permit the aromatic material from the top of fractionator 7 to be mixed with the raffinate in transit through lines 4 and 5 or if desired, valve 9 may be closed and all of the overhead material from fractionator 7 passed through line 8, valve 10 and line 11, into the solvent purifier 12 from which a portion of the solvent passing through line 13 may be passed through valve 17 and line 18 for passage through line 23 into the contactor 24. As solvent is passed through valve 9 or through valve 17 into the alkylation system, then makeup solvent for operation of the extractor 1 may be added to this portion of the system through line 14.

As an example of the operation of my process for the purpose as hereinbefore stated, a catalytic gas oil charge stock is introduced into the extractor 1 through line 2. Phenol as a solvent is introduced into the extractor through line 3 at a point near its top. In this extractor the two liquids are intimately contacted and an olefin and paraffin containing raffinate phase is removed through lines 4 and 5 and passed through drier 15 into the surge tank 21. From this tank the olefinic stock is passed through the line 22 and line 23 into which is introduced a relatively large volume of phenol from line 42 and the mixture at a phenol to olefin ratio of about 4:1 is passed into the contactor 24. Sufficient liquid hydrofluoric acid of 80 to 90 per cent titratable acidity is introduced into the contactor through line 33 to maintain about equal volumes of liquid acid and aromatic-olefin charge stock. After mixing and reacting at about atmospheric temperature the reaction material is passed through line 26 into settler 27 in which an acid phase settles to the bottom and an oil phase rises to the top. The acid phase is removed through line 30 and a portion recycled to the alkylator through line 31 while the remainder is passed through line 34 into the fractionator 35. In this fractionator, free acid, azeotrope, and oil bottoms are separated as hereinbefore described. The free acid is recycled through line 36 into the alkylator 24. The oil phase from the top of the settler 27 is passed through line 28 into the still 29 for separation of any dissolved free acid from the phenol and alkylate product. The free acid is taken through line 39 and recycled through line 36 into the acid phase from line 31. The recovered phenol taken through line 41 is passed through line 42 into the charge to the alkylator for maintenance of the proper aromatic to olefin ratio. The phenol solvent to catalytic gas oil ratio in the extractor 1 may be maintained within the limits of 0.5:1 to 2:1, preferably the ratio should be about 1:1.

The extract phase from the bottom of the extractor 1 is passed through line 6 into the fractionator 7 from which the phenol is taken overhead and the high aromatic extract oil as bottoms is taken through line 51 into the run storage tank 52. From this tank the oil is passed through line 53 as charge stock to the manufacture of a quality carbon black as hereinbefore described.

It will be obvious to those skilled in the art that many variations in processing steps and flow may be practiced and yet remain within the intended spirit and scope of my invention. For example, the small amount of alkylation catalyst acid leaving settler 27 in the upper oil phase may be removed from this oil by washing with a caustic alkali, or a light paraffin such as propane or butane may be added and the mixture distilled to remove the acid as a paraffin HF azeotrope. However, I prefer to distill out the HF as hereinabove described since this acid may be recycled into the alkylation step as active catalyst. If $H_2SO_4$ or phosphoric acid are used as alkylation catalyst, the conditions of alkylation operation may be those best suited for use with these catalysts for the alkylation of catalytic gas oil olefins with such an aromatic material as phenol. The apparatus parts and materials of construction may be selected from among those commercially available and designed for each of the respective process steps. Valves, pumps, temperature and pressure measuring and indicating or recording equipment, flow meters and the like are not shown herein for purposes of simplicity since the installation and operation of such equipment is well known by those skilled in the art.

Having disclosed my invention, I claim:

1. A process for treating a gas-oil produced in a catalytic cracking operation comprising extracting said catalytic gas-oil with an extraction solvent comprising an alkylatable aromatic material to produce a raffinate phase comprising olefin hydrocarbons and dissolved aromatic material and an extract phase comprising aromatic material and soluble aromatic hydrocarbons from said gas-oil, admixing additional alkylatable aromatic material with said raffinate phase and exposing the raffinate phase admixture without separation of the olefins therefrom to alkylation conditions in the presence of an alkylation catalyst to form an alkylate, separating alkylated material from unalkylated material of the alkylate, recovering the separated alkylated material as one product of the process, dividing the separated unalkylated material of the alkylate into two portions, recycling one portion into the original extraction operation, and the other portion into the raffinate phase as said additional alkylatable aromatic material, separating aromatic gas-oil constituents from solvent of said extract phase, recovering the separated aromatic gas-oil constituents as another product of the process and dividing said solvent separated from said extract phase into two portions, adding one portion to said raffinate phase prior to the alkylation operation and recycling the other portion into the original extraction operation as a portion of the extraction solvent, so dividing said solvent from said extract phase into said two portions that the volume of the portion added to said raffinate phase is such as to maintain the volume ratio of the alkylatable aromatic material to the olefin of the charge stock to the alkylation step between the limits of 1:1 and 5:1.

2. The process of claim 1 in which the alkylation catalyst is hydrofluoric acid and the extraction solvent and additional alkylatable aromatic material is phenol.

3. The process of claim 1 in which the alkylation catalyst is hydrofluoric acid, the extraction solvent and the additional alkylatable aromatic material is a single ring phenolic material and extraction temperature is maintained sufficiently high that said phenolic material is liquid at the extraction temperature.

4. The process of claim 1 in which the alkylation catalyst is hydrofluoric acid, the extraction solvent and the additional alkylatable aromatic material is phenol, and the extraction process is carried out at a temperature sufficienty high that the phenol is in liquid state.

LUKE B. GOODSON.

REFERENCES CITED

The following references are of record in the file of this patent:

UNITED STATES PATENTS

| Number | Name | Date |
| --- | --- | --- |
| 2,228,510 | Dearborn et al. | Jan. 14, 1941 |
| 2,375,796 | Krejci | May 15, 1945 |
| 2,423,470 | Simons | July 8, 1947 |
| 2,434,623 | Meadow et al. | Jan. 13, 1948 |